(12) United States Patent
Bari

(10) Patent No.: US 12,728,908 B2
(45) Date of Patent: Sep. 8, 2026

(54) TORSION BAR

(71) Applicant: ZF CV Systems Global GmbH, Bern (CH)

(72) Inventor: Praful Bari, West Lafayette, IN (US)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 19/039,791

(22) Filed: Jan. 29, 2025

(65) Prior Publication Data

US 2026/0217301 A1 Jul. 30, 2026

(51) Int. Cl.
*B62D 1/19* (2006.01)

(52) U.S. Cl.
CPC .................................... *B62D 1/19* (2013.01)

(58) Field of Classification Search
CPC ........................................................ B62D 1/20
See application file for complete search history.

(56) References Cited

U.S. PATENT DOCUMENTS 5,678,454 A * 10/1997 Cartwright ............ B62D 1/184 74/531
7,717,463 B2 * 5/2010 Fong ..................... B62D 1/181 280/775
2007/0194563 A1 * 8/2007 Menjak ................. B62D 1/195 280/777
2015/0127220 A1 * 5/2015 Kirschbaum ........ B62D 5/0835 701/41
2016/0129930 A1 * 5/2016 Volmering .............. B62D 1/20 74/498
2021/0129891 A1 * 5/2021 Ryne ...................... B62D 1/185

FOREIGN PATENT DOCUMENTS

CN 202208306 U * 5/2012
CN 102530051 A * 7/2012
CN 104709348 A * 6/2015 ......... B62D 15/0265
CN 110243514 A * 9/2019 ............... F16D 1/10
CN 110461496 A * 11/2019 ............... B21J 5/10
CN 114161104 A * 3/2022 ............... F16C 3/03
CN 114684248 A * 7/2022 ............... B62D 1/20
CN 115123371 A * 9/2022 ............... B62D 1/20
CN 116133932 A * 5/2023 ............... B62D 6/10
CN 116513297 A * 8/2023 ............. B62D 1/192
CN 118270090 A * 7/2024 ............. B62D 7/224

(Continued)

*Primary Examiner* — Nicole T Verley
(74) *Attorney, Agent, or Firm* — LEYDIG, VOIT & MAYER, LTD.

(57) ABSTRACT

A steering column of a commercial vehicle having a natural frequency of vibration is provided. The steering column includes an input shaft disposed within the steering column. The input shaft is coupled to a steering wheel at a first end. An output shaft is disposed within the steering column. A second end of the output shaft is coupled to a steering gear and a first end of the output shaft is connected to a second end of the input shaft. A torsion bar is disposed within the steering column. A first end of the torsion bar is connected to the second end of the input shaft and a second end of the torsion bar is connected to the first end of the output shaft. The torsion bar is designed to have a stiffness selected to dampen an amplitude of vibration of the steering column at the natural frequency.

12 Claims, 5 Drawing Sheets

(56) References Cited

FOREIGN PATENT DOCUMENTS

| | | | | | |
|---|---|---|---|---|---|
| DE | 102017120669 | B4 | * | 3/2025 | B62D 5/006 |
| EP | 0396895 | A1 | * | 11/1990 | B62D 5/22 |
| EP | 1985521 | A2 | * | 10/2008 | B62D 1/195 |
| EP | 1988009 | A1 | * | 11/2008 | B62K 21/08 |
| EP | 3670296 | A1 | * | 6/2020 | B62D 3/02 |
| GB | 191205304 | A | * | 7/1912 | B62D 1/189 |
| JP | 2023104296 | A | * | 7/2023 | |
| JP | 2023554535 | A | * | 12/2023 | B62D 15/025 |
| WO | WO-2005005850 | A1 | * | 1/2005 | B62D 1/20 |
| WO | WO-2015136951 | A1 | * | 9/2015 | B62D 1/16 |
| WO | WO-2018179929 | A1 | * | 10/2018 | B21K 1/12 |
| WO | WO-2023006214 | A1 | * | 2/2023 | F16D 3/387 |
| WO | WO-2024009794 | A1 | * | 1/2024 | B62D 1/16 |

* cited by examiner

TORSION BAR

The present disclosure relates to a steering column for a commercial vehicle.

BACKGROUND

A well-recognized issue in commercial vehicles is vibration of the steering columns of commercial vehicles, which is often caused due to tire wind-up, which refers to the twisting or deformation of a tire under torque applied during acceleration or braking. The vibration of the steering column is more pronounced in vehicles with independent front suspension (IFS) systems that resonate at around 10 Hz. These vibrations are further amplified in conventional commercial vehicles by heavy torque overlay systems installed on the steering columns, leading to decreased steering performance and customer dissatisfaction. Previous solutions, such as incorporating rag joints in steering columns, have helped reduce vibrations in trucks but add complexity and can negatively impact steering feel.

SUMMARY

Embodiments of the present disclosure provide, in a first aspect, a steering column of a commercial vehicle having a natural frequency of vibration, comprising: an input shaft disposed within the steering column extending along an axial direction, wherein the input shaft is mechanically coupled to a steering wheel assembly at a first end of the input shaft; an output shaft disposed within the steering column, extending along the axial direction, wherein the output shaft is mechanically coupled to a steering gear at a second end of the output shaft, and wherein a first end of the output shaft is mechanically coupled to a second end of the input shaft; and a torsion bar disposed within the steering column extending along an axial direction, wherein a first end of the torsion bar is non-rotatably connected to the second end of the input shaft and a second end of the torsion bar is non-rotatably connected to the first end of the output shaft, wherein the torsion bar is designed to have a stiffness selected to dampen an amplitude of vibration of the steering column at the natural frequency of the steering column.

According to an implementation of the first aspect, the torsion bar comprises a torsion rod that mechanically couples the first end of the torsion bar to the second end of the torsion bar.

According to an implementation of the first aspect, the first end of the torsion bar has a first radius, and the torsion rod has a second radius, and wherein the first radius is equal to the second radius.

According to an implementation of the first aspect, the second end of the torsion bar has a plurality of splines to secure a connection between the second end of the torsion bar and the first end of the output shaft.

According to an implementation of the first aspect, the first end of the torsion bar includes a pin that secures a connection between the first end of the torsion bar to the second end of the input shaft.

According to an implementation of the first aspect, the torsion bar has stiffness in a range of 6 Newton-meter/degree (n-m/degree) to 10 N-m/degree.

According to an implementation of the first aspect, the torsion bar has stiffness of approximately 7 Newton-meter/degree.

According to an implementation of the first aspect, the steering column further comprises: a torque overlay system coupled to the steering column, wherein the torque overlay system provides steering assistance to the steering column, and wherein the amplitude of vibration of the steering column at the natural frequency increases based on a size of the torque overlay system.

Embodiments of the present disclosure provide, in a second aspect, a method of reducing vibration of a steering column, comprising: providing an input shaft disposed within the steering column extending along an axial direction, wherein the input shaft is mechanically coupled to a steering wheel assembly at a first end of the input shaft; providing an output shaft disposed within the steering column, extending along the axial direction, wherein the output shaft is mechanically coupled to a steering gear at a second end of the output shaft, and wherein a first end of the output shaft is mechanically coupled to a second end of the input shaft; providing a torsion bar disposed within the steering column extending along an axial direction, wherein a first end of the torsion bar is non-rotatably connected to the second end of the input shaft and a second end of the torsion bar is non-rotatably connected to the first end of the output shaft; determining a natural vibration frequency of the steering column; and replacing the torsion bar of the steering column with a new torsion bar, wherein the new torsion bar is designed to have a stiffness selected to dampen an amplitude of vibration of the steering column at the natural frequency of the steering column.

According to an implementation of the second aspect, the torsion bar comprises a torsion rod that mechanically couples the first end of the torsion bar to the second end of the torsion bar.

According to an implementation of the second aspect, the first end of the torsion bar has a first radius, and the torsion rod has a second radius, and wherein the first radius is equal to the second radius.

According to an implementation of the second aspect, the second end of the torsion bar has a plurality of splines to secure a connection between the second end of the torsion bar and the first end of the output shaft.

According to an implementation of the second aspect, the first end of the torsion bar includes a pin that secures a connection between the first end of the torsion bar to the second end of the input shaft.

According to an implementation of the second aspect, the torsion bar has stiffness in a range of 6 Newton-meter/degree (n-m/degree) to 10 N-m/degree.

According to an implementation of the second aspect, the torsion bar has stiffness of approximately 7 Newton-meter/degree.

According to an implementation of the second aspect, the method further comprises: providing a torque overlay system coupled to the steering column, wherein the torque overlay system provides steering assistance to the steering column; and determining an increase in the amplitude of vibration of the steering column at the natural frequency based on a size of the torque overlay system.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

Figure 1:
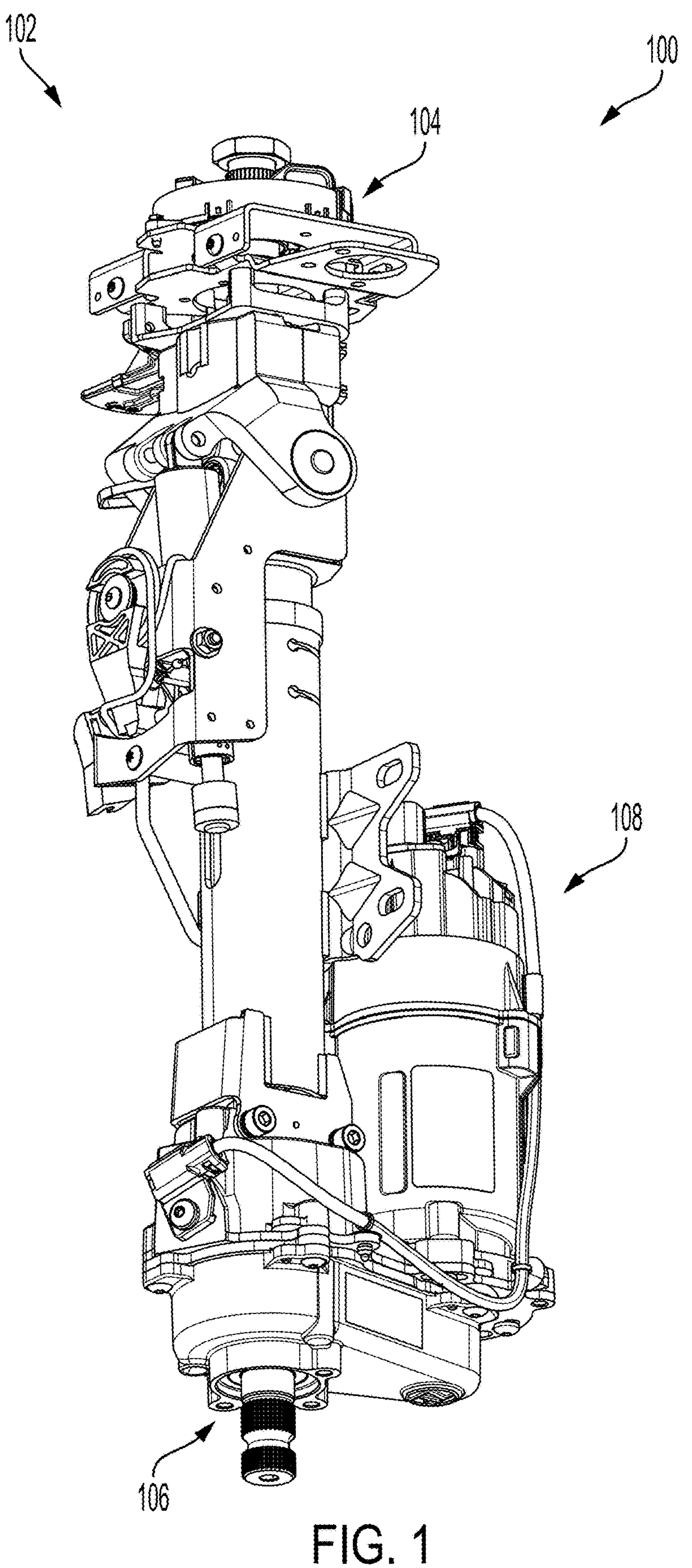
FIG. 1 illustrates a vertical perspective view of a steering column of a commercial vehicle, according to one or more examples of the present disclosure.

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term “a” and/or “an” shall mean “one or more” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on”.

Steering columns installed in commercial vehicles are susceptible to wear and tear due to tire windup. Tire windup refers to a twisting deformation that occurs in tires of a commercial vehicle, usually during acceleration, braking, or when the tires are subjected to torque. As torque is applied through the system of components that transmit power from the engine to the wheels-including the transmission, driveshaft, differential, and axles—the tires experience a wind-up effect due to the elastic properties of the rubber, which causes the tires to momentarily twist or deform before fully rotating. This temporary twisting action of the tires builds up energy that, when released, can cause vibrations. These vibrations travel from the tire through the suspension and steering components to a steering wheel via a steering column of the commercial vehicle. The vibrations of the steering column and steering wheel lead to decreased steering performance. These vibrations are often most prominent at specific frequencies (like around 10 Hz in some independent front suspension systems), causing a feedback loop that can be felt in the steering wheel, leading to an uncomfortable ride and affecting handling stability. In some embodiments, the vibrations going through the steering column are amplified by hanging the weight of the motor (e.g., driving assistance modules such as ReAX modules) that are installed on steering columns. For example, the added weight of the torque overlay systems, such as a ReAX module, may exacerbate vibrations of the steering column.

Rag joints have been previously incorporated in steering columns to attempt to reduce vibrations in steering columns and steering wheels. However, incorporating rag joints to reduce steering column vibrations introduces complexity in steering column design and negatively impacts the feel of the steering wheel for drivers of commercial vehicles.

In some embodiments, the steering column components may have a natural frequency of vibration during operation. The amplitude of vibration may come from steering systems which includes tire winding and may be amplified when a ReAX module coupled to the steering column is turned on to provide steering assistance. In such cases, the present disclosure describes a novel design of a torsion bar that is optimized to dampen the vibration of the steering column. For example, the present disclosure describes using an optimized torsion bar (T-bar) design with a stiffness level set at 7 Newton-meter/degree (N-m/deg) which effectively dampens the vibrations of the steering column and steering wheel at the natural vibration frequency of the steering column without needing additional dampening mechanisms such as a support bracket or rag joints to support existing steering columns and minimize the vibrations generated by the tire winding. Using the optimized T-bar design with a stiffness level set at 7 N-m/deg within the steering column, the vibration (coming from tire winding) of the steering column is addressed at its source, delivering a smooth, controlled steering experience.

FIG. 1 illustrates a vertical perspective view of a steering column of a commercial vehicle, according to one or more examples of the present disclosure. FIG. 1 depicts a vertical perspective view 100 of the steering column 102. Steering column 102 includes a first portion 104, a second portion 106. In some embodiments, the first portion 104 of the steering column 102 may be connected to a steering wheel assembly of the commercial vehicle. In some embodiments, the second portion 106 of the steering column 102 may be connected to a steering gear. The steering gear may be connected to a wheel assembly of the commercial vehicle. Steering commands generated by drivers at the steering wheel of the recreational vehicle may be conveyed to the wheel assemblies of the recreational vehicle via the steering column 102.

In some embodiments, a torque overlay system (e.g., ReAX system) 108 is installed on the steering column 102 to provide driving assistance to the steering column 102 and a driver associated with the steering wheel assembly operating the commercial vehicle. In such embodiments, the torque overlay system 108 may be heavy.

As the commercial vehicle is in operation, vibrations are generated in the wheel assemblies of the commercial vehicles. The vibrations generated in the wheel assemblies of the commercial vehicles are transmitted through the second portion 106 of the steering column 102, via the first portion 104 of the steering column 102 to a steering wheel associated with the steering column 102. In some embodiments, the torque overlay system 108 may amplify the vibrations of the steering column 102.

Figure 2:
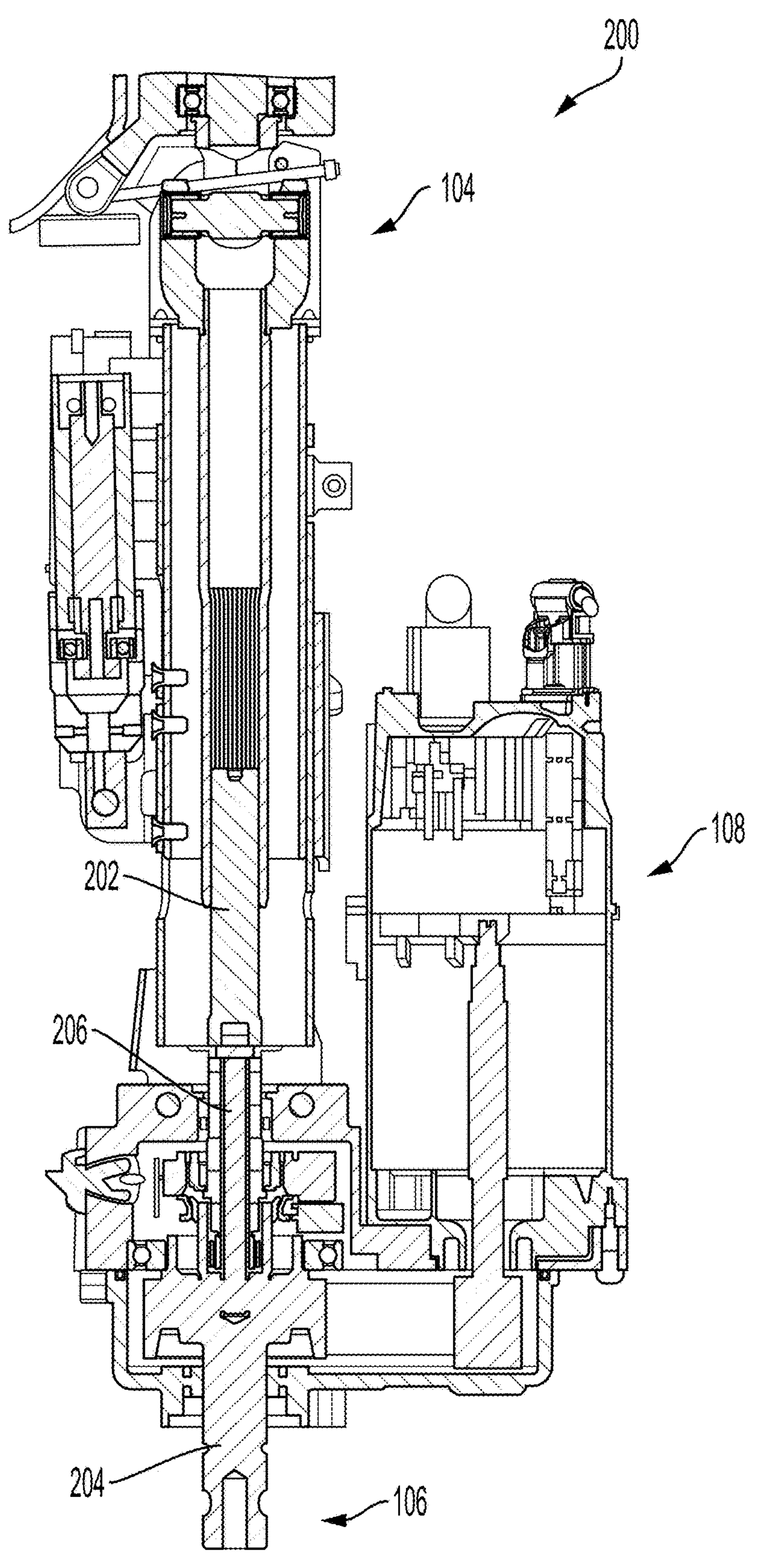
FIG. 2 illustrates a vertical cross-sectional view of a steering column of a commercial vehicle along with a torsion bar, according to one or more examples of the present disclosure.

FIG. 2 illustrates a vertical cross-sectional view of a steering column of a commercial vehicle along with a torsion bar, according to one or more examples of the present disclosure. FIG. 2 depicts a cross-sectional perspective view 200 of the steering column 102. As described with respect to FIG. 1, the steering column 102 includes a first portion 104 that may be connected to a steering wheel assembly and a second portion 106 that may be connected to a steering gear. A torque overlay system 108 may be coupled to the steering column 102 to provide a driver of the commercial vehicle with steering and lane assistance.

In some embodiments, an input shaft 202, a torsion bar 206, and an output shaft 204 may be included within the steering column 102. The input shaft 202, output shaft 204, and torsion bar 206 work together to transmit and control the rotational force (torque) from a steering wheel of the commercial vehicle, that is mechanically coupled to the first part 104 of the steering column 102, to the steering gear that is coupled to the second part 106 of the steering column 102, to turn the wheels of the commercial vehicle.

The input shaft 202 is disposed along a length of the steering column 102 such that a first end of the input shaft 202 is disposed closer to the first part 104 of the steering column 102, and a second end of the input shaft 202 is disposed closer to a first end of the output shaft 204. Additionally, a second end of the output shaft 204 is disposed closer to the second end 106 of the steering column 102. In some embodiments, the first end of the output shaft 204 may be mechanically coupled to the second end of the input shaft 202.

According to embodiments of the present disclosure, the torsion bar 206 serves as a coupling mechanism between the input shaft 202 and the output shaft 204. For example, a second end of the input shaft 202 is connected to a first end of the torsion bar, and a first end of the output shaft 204 is connected to a second end of the torsion bar 206.

In some embodiments, the input shaft 202 serves as a starting point for transmitting steering effort from a steering wheel of a commercial vehicle to wheels of the commercial vehicle. For instance, the first end of the input shaft 202 may be mechanically coupled to the first part 104 of the steering column 102. When a driver turns the steering wheel of a commercial vehicle, a torque corresponding to the turning force applied to the steering wheel is applied to the input shaft 202 via the first part of the steering column 102, which initiates the steering action.

The torque applied to the input shaft 202 is transferred to the torsion bar 206, twisting the torsion bar 206. According to some embodiments, as the driver turns the steering wheel, torque is applied to the input shaft 202. The torque from the input shaft 202 is transferred to the torsion bar 206, and the torsion bar 206 twists proportionally to the torque applied from the input shaft 202. This twisting action of the torsion bar 202 may act also as a feedback mechanism, allowing torque overlay system 108 to sense the steering force and respond appropriately. For example, in electric powered steering systems, the twist of the torsion bar 206 controls hydraulic or electric assistance (e.g., as provided by the torque overlay system 108), making steering easier or harder depending on speed and resistance.

In some embodiments, the second end of the torsion bar 206 may be connected to the first end of the output shaft 204. The second end of the output shaft may be coupled to steering gears. In such cases, the rotation of the input shaft 202, is transferred, via the torsion bar 206 to the output shaft 204. The rotation of the output shaft 204 is transferred to steering gears that lead to the steering of the wheels of the commercial vehicle.

In some cases, stiffness of the torsion bar 206 affects steering feel and user experience related to steering. For example, a stiffer torsion bar (one with a higher torque rating) creates a firmer, more responsive steering feel. Conversely, a softer torsion bar provides lighter steering. As described above, operation of the commercial vehicle may cause tire windup which may lead to a vibration in steering column 102 and associated steering wheel. In some embodiments, the torsion bar 206 may be designed to reduce the vibrations of the steering column. For example, the torsion bar 206 may be designed so as to increase the stiffness of the torsion bar 206. A stiffer torsion bar 206 may dampen the vibration of the steering column 102 without the need for additional elements.

In some cases, the design of the torsion bar 206 may increase a stiffness of the torsion bar 206 to a value in the range of 5 N-m/degree to 15 N-m/degree. In some embodiments, the stiffness of the torsion bar 206 may be increased to a value within the range of 6 N-m/degree to 10 N-m/degree. In some embodiments, the stiffness of the torsion bar 206 may be increased to approximately 7 N-m/degree. In some embodiments, the stiffness of the torsion bar 206 may be increased or decreased by 0.25 N-m/degree. In such a case, there is a drastic reduction in the vibration of the steering column 102 and the associated steering wheel. The torsion bar 206 with a stiffness of approximately 7 N-m/degree allows for smooth, controlled steering with feedback that helps drivers maintain stability and adjust their steering efforts based on the vehicle's speed and road conditions.

Figure 3:
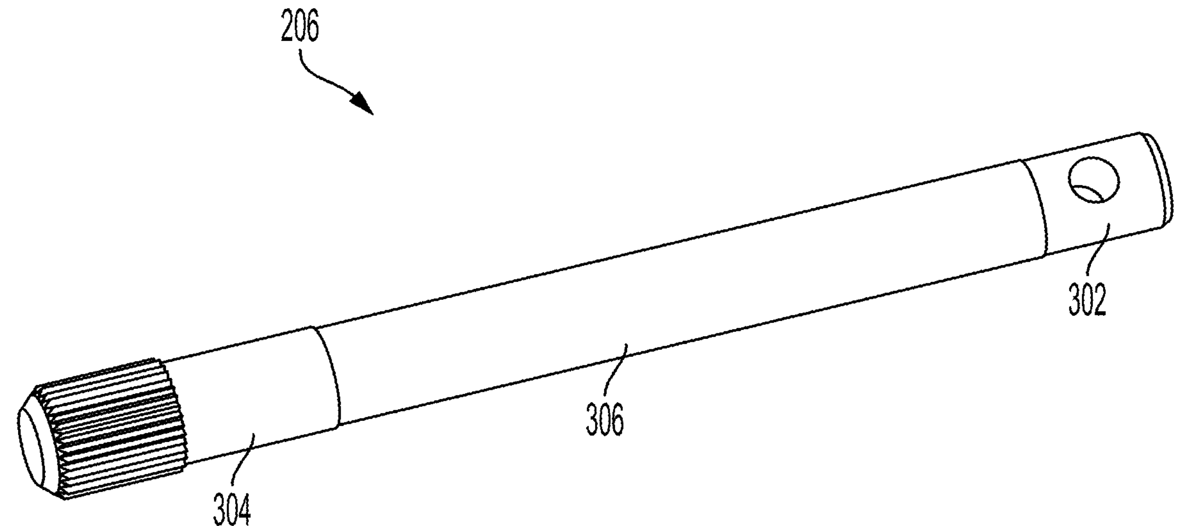
FIG. 3 illustrates a perspective view of a torsion bar, according to one or more examples of the present disclosure.

FIG. 3 illustrates a perspective view of a torsion bar, according to one or more examples of the present disclosure. Perspective view 300 depicts a torsion bar 206 that includes a first end 302, a second end 304, and a torsion rod 306. As described with respect to FIG. 2, the first end 302 of the torsion bar 302 may be connected to a second end of the input shaft 202 and the second end 304 of the torsion bar 206 may be connected to a first end of the output shaft 204.

In some embodiments, a radius of the first end 302 of the torsion bar may be equal to a radius of the torsion rod 306 of the torsion bar 206. In such embodiments, when the radius of the first end 302 of the torsion bar 206 is equal to the radius of the torsion rod 306, the torsion bar attains a stiffness of approximately 7 N-m/degree, which assists in dampening the vibration of the steering column 102 in which the torsion bar 206 is installed.

In some embodiments, the second end 304 of the torsion rod 206 may include splines that secure the connection between the second end 304 of torsion bar 206 and the first end of the output shaft 204.

According to embodiments of the present disclosure, the design of the torsion bar 206, as shown in FIG. 3 increases a stiffness of the torsion bar. For example, conventionally designed torsion bars that are used in conventional steering columns of commercial vehicles have an approximate thickness of 2.5 N-m/degree. The torsion bar 206 is designed to have a stiffness of approximately 7 N-m/degree so as to reduce the amplitude of vibration of the steering column 102 at the natural vibration frequency (e.g., 9 Hz) of the steering column 102. As such, the design of the torsion bar 206, as shown in FIG. 3, leads to an increase in stiffness of the torsion bar from 2.5 N-m/degree to approximately 7 N-m/degree. The increase in stiffness of the torsion bar 206 drastically decreases the amplitude of vibrations felt in the steering column 102 at the natural vibration frequency of the steering column, leading to a much smoother operation.

In some embodiments, the torsion bar 206 may be composed of metal. For example, the torsion bar 206 may be composed of steel.

Figure 4:
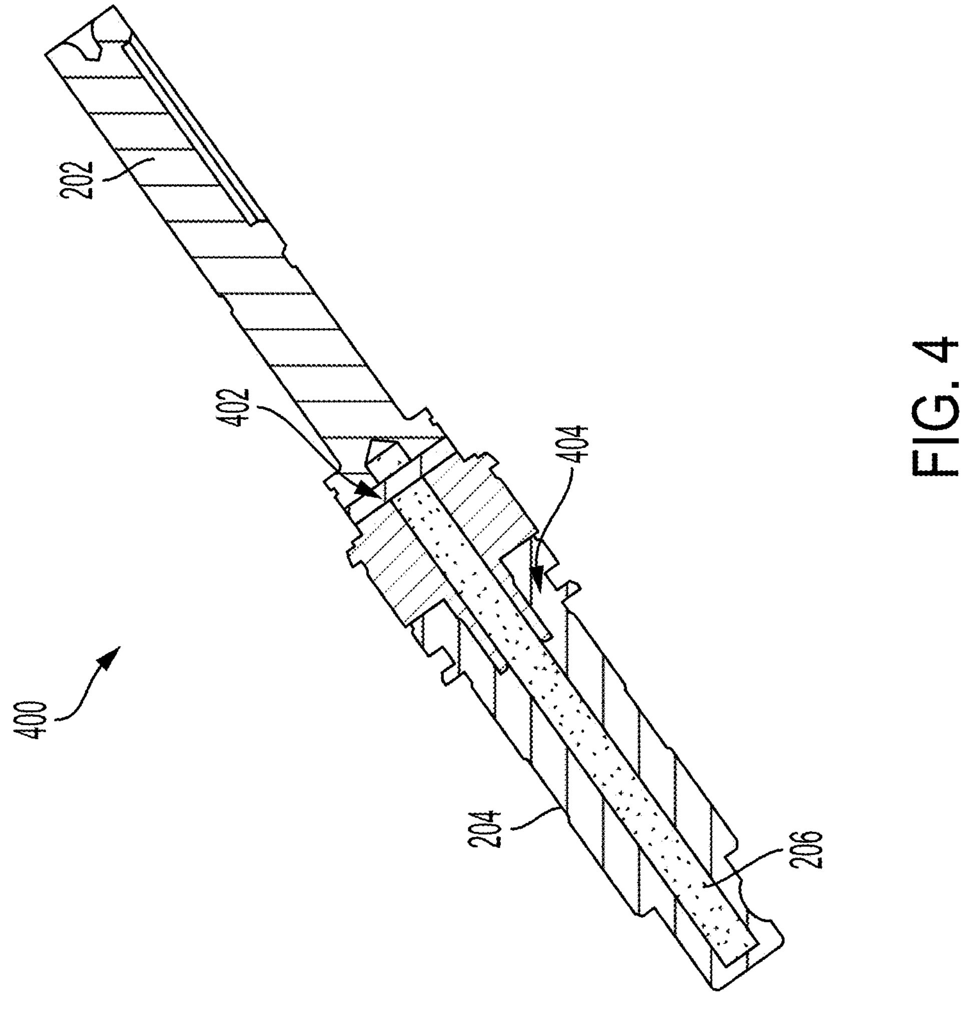
FIG. 4 illustrates a perspective view of a torsion bar, according to one or more examples of the present disclosure.

FIG. 4 illustrates a perspective view of a torsion bar, according to one or more examples of the present disclosure. Perspective view 400 depicts a torsion bar 206 as it is disposed within the input shaft 202 and the output shaft 204. As discussed with respect to FIG. 2, the first end of the input shaft 202 is mechanically coupled to the first part 104 of the steering column 102, which is in turn mechanically coupled to the steering wheel of the commercial vehicle. The second end of the input shaft 202 is disposed near the first end of the output shaft 204. In some cases, the second end of the input shaft 202 may be mechanically coupled to the first end of the output shaft 204. In some other embodiments, the torsion bar 206 may be used to mechanically couple the second end of the input shaft 202 to the first end of the output shaft 204.

A first end of the torsion bar 206 is mechanically coupled to the second end of the torsion bar 206, and a second end of the torsion bar 206 is mechanically coupled to the first end of the output shaft 204. In some embodiments, a pin 402 may be used to couple the first end 302 of the torsion bar 206 to the second end of the input shaft 202 of the steering column 102.

Figure 5:
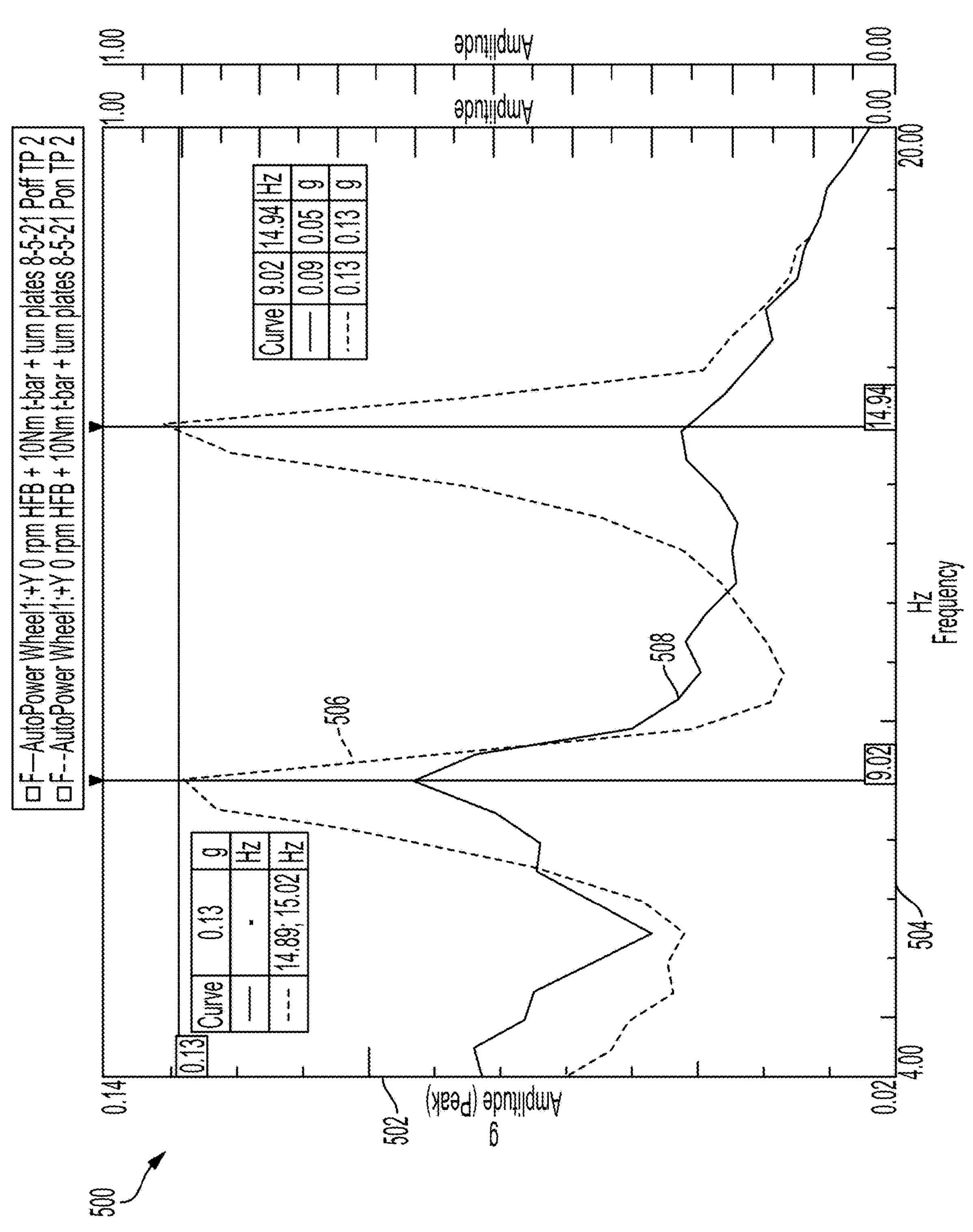
FIG. 5 illustrates a graphical representation of a performance of the torsion bar, according to one or more examples of the present disclosure.

FIG. 5 illustrates a graphical representation of a performance of the torsion bar, according to one or more examples of the present disclosure. Graph 500 of FIG. 5 measures a vibration frequency of the steering column on the x-axis 504 and an amplitude of vibration of the steering column on the y-axis 502.

Curve 508 plots an amplitude of oscillation of the steering column 102 at various vibration frequencies along with the torsion bar 206 when the torque overlay system (e.g., ReAX system) 108 is turned off during operation of the commercial vehicle. As is shown in the graph 500, the amplitude of oscillation of the steering column, when the torque overlay system 108 is turned off has a peak of 0.075 g (where g stands for gravitational acceleration). The peak amplitude of oscillation is measured at a frequency of 9 Hz (e.g., the natural vibration frequency of the steering column).

Curve 506 plots an amplitude of oscillation of the steering column 102 along with the torsion bar 206 when the torque overlay system (e.g., ReAX system) 108 is turned on during operation of the commercial vehicle. As is shown in the graph 500, the amplitude of oscillation of the steering column along with the torsion bar 206, when the torque overlay system 108 is turned on has a peak of 0.13 g (where g stands for acceleration due to gravity). The peak amplitude of oscillation is measured at frequencies of 9 Hz (e.g., the natural vibration frequency of the steering column) and 15 Hz. From plot 506, it is clear that the amplitude of vibration of the steering column 102, at the natural vibration of the frequency of the steering column 102 (e.g., 9H Hz) is low. Thus, the vibration of the steering column 102 with the torsion bar 206 is almost imperceptible to a driver of the commercial vehicle.

The peak amplitude of 0.13 g in steering columns installed with torsion bar 206, as plotted by the curve 506, is drastically lower than a peak amplitude of vibration measured in steering columns with conventional torsion bars. As discussed above, conventional torsion bars have a lower stiffness (e.g., approximately 2.5 N-m/degree) while the torsion bar 206, as described herein, has a stiffness of approximately 7 N-m/degree. The peak amplitude of vibration of the steering column fitted with the conventional torsion bar, measured at a time with the torque overlay system 108 is turned on, is approximately 0.375 g (where g stands for acceleration due to gravity) at the natural vibration frequency of the steering column 102 (e.g., 9 Hz). A peak amplitude of 0.375 g generates a significant vibration of the steering column 102 which is felt by the driver of the commercial vehicle, leading to unsatisfactory experience. On the other hand, the amplitude of oscillation of the steering column 102 with the torsion bar 206, when the torque overlay system 108 is turned on, has a much lower peak of 0.13 g (where g stands for acceleration due to gravity) at the natural vibration frequency of the steering column 102 (e.g., 9 Hz).

Therefore, the torsion bar 206, designed to have a stiffness of approximately 7 N-m/degree, significantly reduces an amplitude of vibration of the steering column 102 at the natural vibration frequency of the steering column 102 (e.g., 9 Hz), thereby avoiding the complexities of components like rag joints or aftermarket dampeners for use in a steering column 102 and emphasizes the simplicity and efficacy of the design for long-term vibration reduction and steering performance.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A steering column of a commercial vehicle having a natural frequency of vibration, comprising:

an input shaft disposed within the steering column extending along an axial direction, wherein the input shaft is mechanically coupled to a steering wheel assembly at a first end of the input shaft;

an output shaft disposed within the steering column, extending along the axial direction, wherein the output shaft is mechanically coupled to a steering gear at a second end of the output shaft, and wherein a first end of the output shaft is mechanically coupled to a second end of the input shaft; and a torsion bar disposed within the steering column extending along an axial direction, wherein a first end of the torsion bar is non-rotatably connected to the second end of the input shaft and a second end of the torsion bar is non-rotatably connected to the first end of the output shaft, wherein the torsion bar is designed to have a stiffness selected to dampen an amplitude of vibration of the steering column at the natural frequency of the steering column, wherein the first end of the torsion bar includes a pin that secures a connection between the first end of the torsion bar to the second end of the input shaft, and wherein the torsion bar comprises a torsion rod that mechanically couples the first end of the torsion bar to the second end of the torsion bar.

2. The steering column of claim 1, wherein the first end of the torsion bar has a first radius, and the torsion rod has a second radius, and wherein the first radius is equal to the second radius.

3. The steering column of claim 1, wherein the second end of the torsion bar has a plurality of splines to secure a connection between the second end of the torsion bar and the first end of the output shaft.

4. The steering column of claim 1, wherein the torsion bar has stiffness in a range of 6 Newton-meter/degree (n-m/degree) to 10 N-m/degree.

5. The steering column of claim 1, wherein the torsion bar has stiffness of approximately 7 Newton-meter/degree.

6. The steering column of claim 1, further comprising:

a torque overlay system coupled to the steering column, wherein the torque overlay system provides steering assistance to the steering column, and wherein the amplitude of vibration of the steering column at the natural frequency increases based on a size of the torque overlay system.

7. A method of reducing vibration of a steering column, comprising:

providing an input shaft disposed within the steering column extending along an axial direction, wherein the input shaft is mechanically coupled to a steering wheel assembly at a first end of the input shaft;

providing an output shaft disposed within the steering column, extending along the axial direction, wherein the output shaft is mechanically coupled to a steering gear at a second end of the output shaft, and wherein a first end of the output shaft is mechanically coupled to a second end of the input shaft;

providing a torsion bar disposed within the steering column extending along an axial direction, wherein a first end of the torsion bar is non-rotatably connected to the second end of the input shaft and a second end of the torsion bar is non-rotatably connected to the first end of the output shaft;

determining a natural vibration frequency of the steering column; and replacing the torsion bar of the steering column with a new torsion bar, wherein the new torsion bar is designed to have a stiffness selected to dampen an amplitude of vibration of the steering column at the natural frequency of the steering column, wherein the first end of the torsion bar includes a pin that secures a connection between the first end of the torsion bar to the second end of the input shaft, and wherein the torsion bar comprises a torsion rod that mechanically couples the first end of the torsion bar to the second end of the torsion bar.

8. The method of claim 7, wherein the first end of the torsion bar has a first radius, and the torsion rod has a second radius, and wherein the first radius is equal to the second radius.

9. The method of claim 7, wherein the second end of the torsion bar has a plurality of splines to secure a connection between the second end of the torsion bar and the first end of the output shaft.

10. The method of claim 7, wherein the torsion bar has stiffness in a range of 6 Newton-meter/degree (n-m/degree) to 10 N-m/degree.

11. The method of claim 7, wherein the torsion bar has stiffness of approximately 7 Newton-meter/degree.

12. The method of claim 7, further comprising:

providing a torque overlay system coupled to the steering column, wherein the torque overlay system provides steering assistance to the steering column; and determining an increase in the amplitude of vibration of the steering column at the natural frequency based on a size of the torque overlay system.

* * * * *